Sept. 9, 1958 C. R. McCLOY 2,851,555
SPEED REGULATING MEANS FOR VEHICLES
Filed Jan. 11, 1956 5 Sheets-Sheet 1
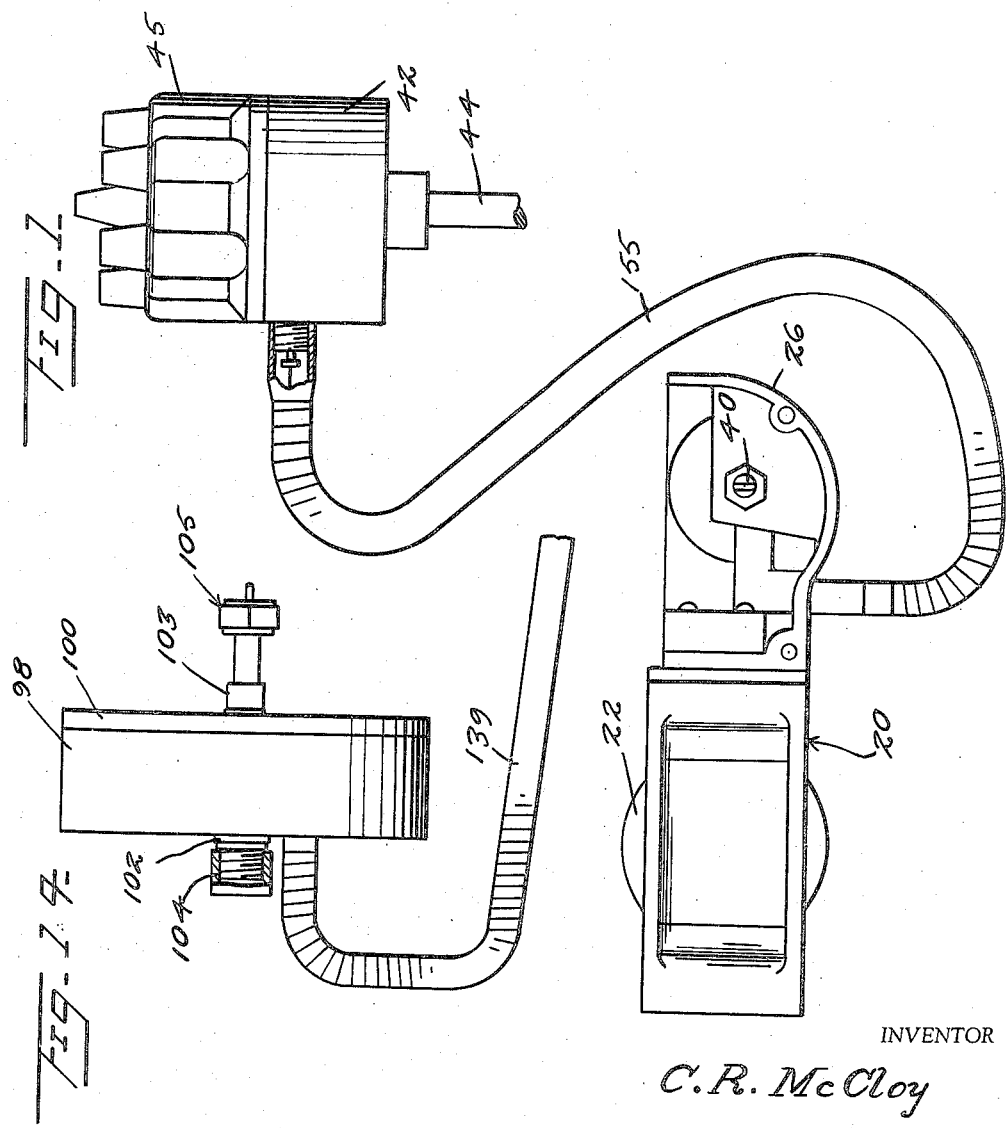
INVENTOR
C. R. McCloy
BY Kimmel & Crowell
ATTORNEYS Sept. 9, 1958 C. R. McCLOY 2,851,555
SPEED REGULATING MEANS FOR VEHICLES
Filed Jan. 11, 1956 5 Sheets-Sheet 2
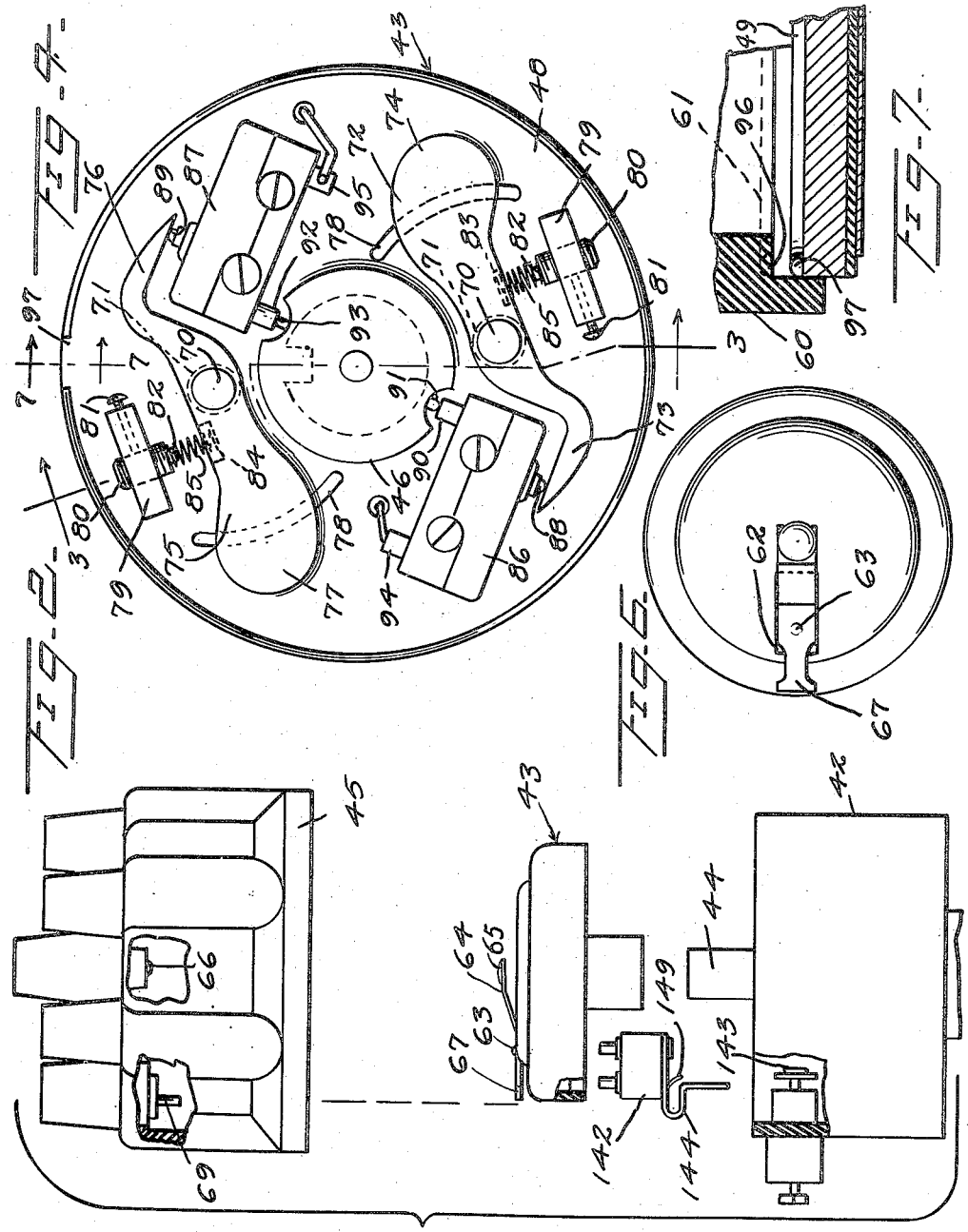
INVENTOR
C. R. McCloy
BY Kimmel & Crowell
ATTORNEYS Sept. 9, 1958　　　　C. R. McCLOY　　　　2,851,555
SPEED REGULATING MEANS FOR VEHICLES
Filed Jan. 11, 1956　　　　　　　　　　5 Sheets-Sheet 3
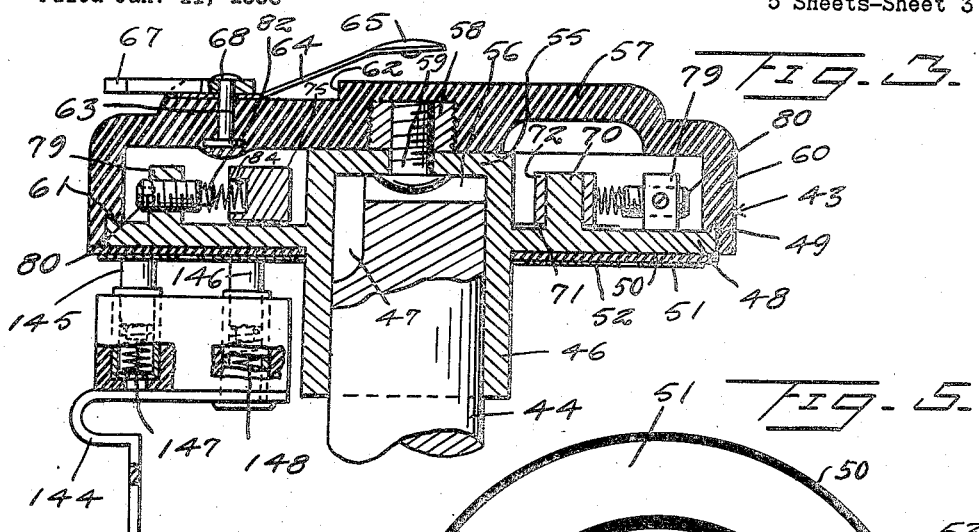
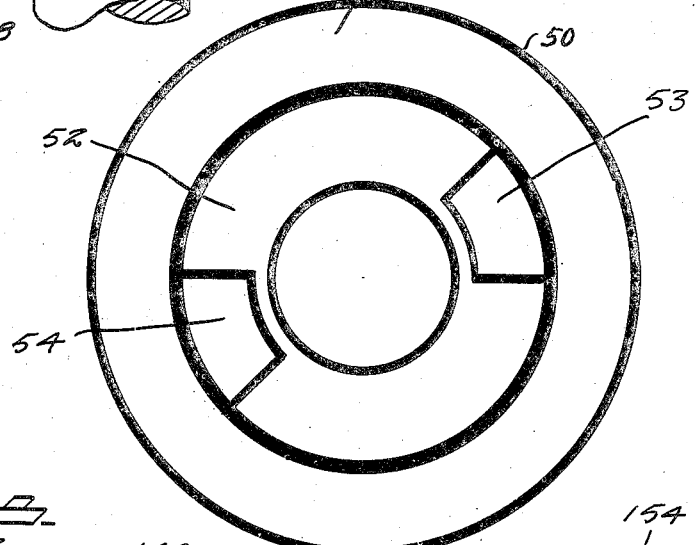
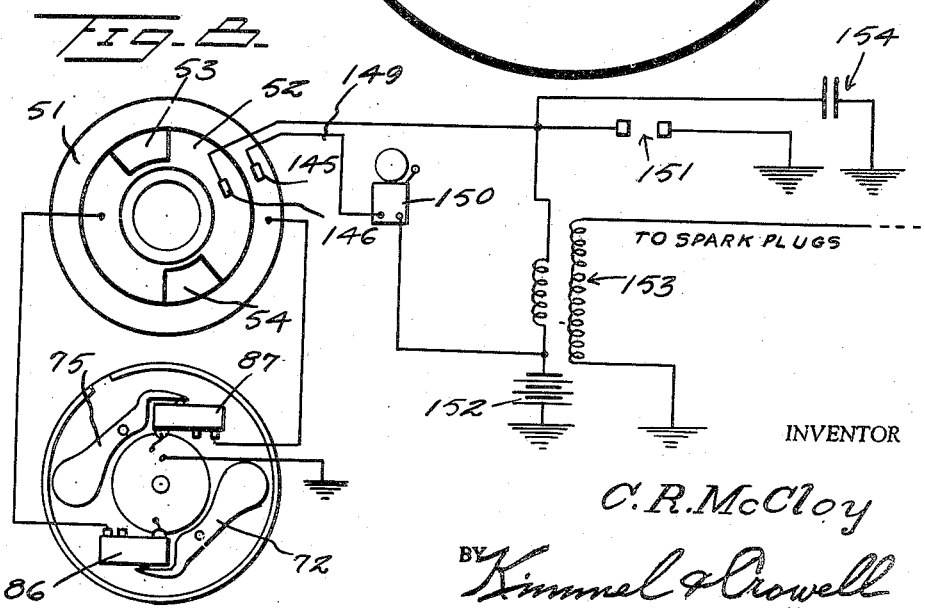
INVENTOR
C. R. McCloy
BY Kimmel & Crowell
ATTORNEYS Sept. 9, 1958 C. R. McCLOY 2,851,555
SPEED REGULATING MEANS FOR VEHICLES
Filed Jan. 11, 1956 5 Sheets-Sheet 4
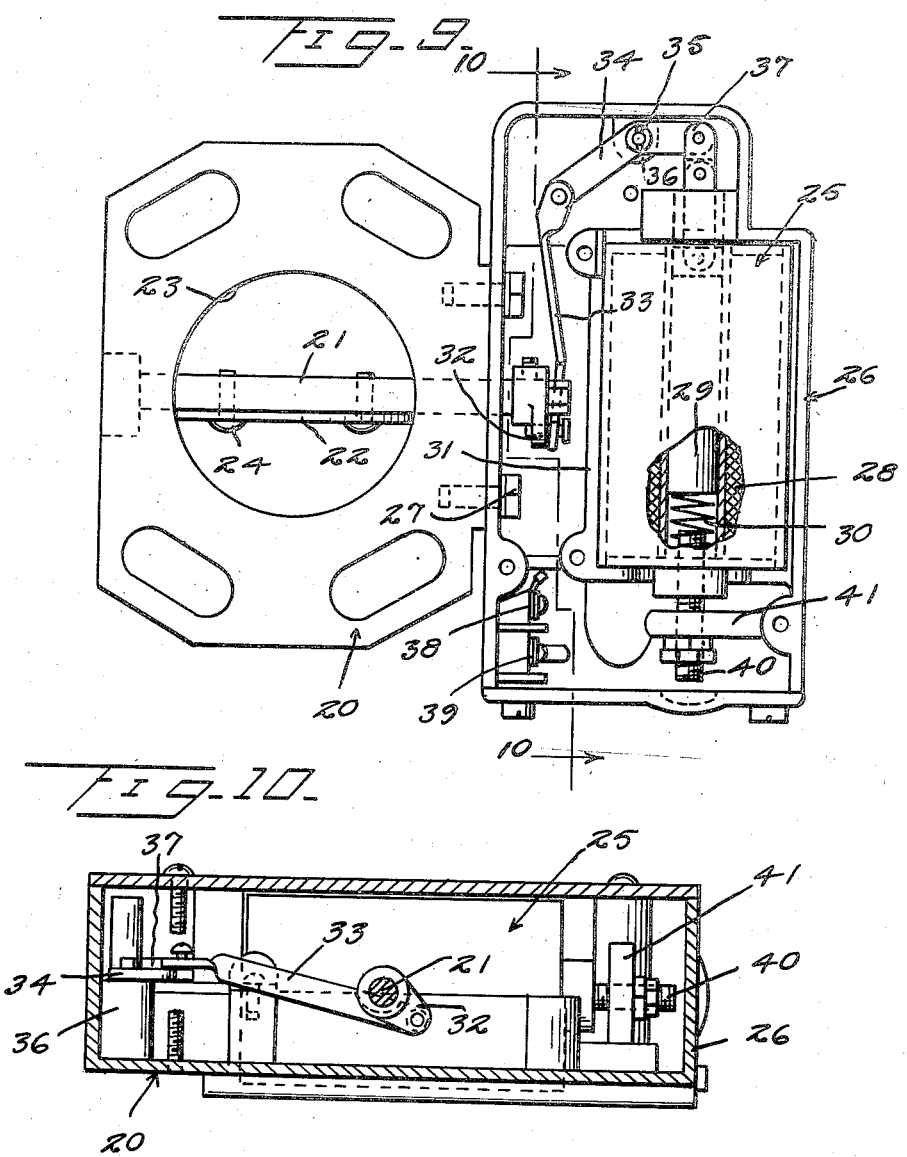
INVENTOR
C. R. McCloy
BY Kimmel & Crowell
ATTORNEYS Sept. 9, 1958  C. R. McCLOY  2,851,555
SPEED REGULATING MEANS FOR VEHICLES
Filed Jan. 11, 1956  5 Sheets-Sheet 5
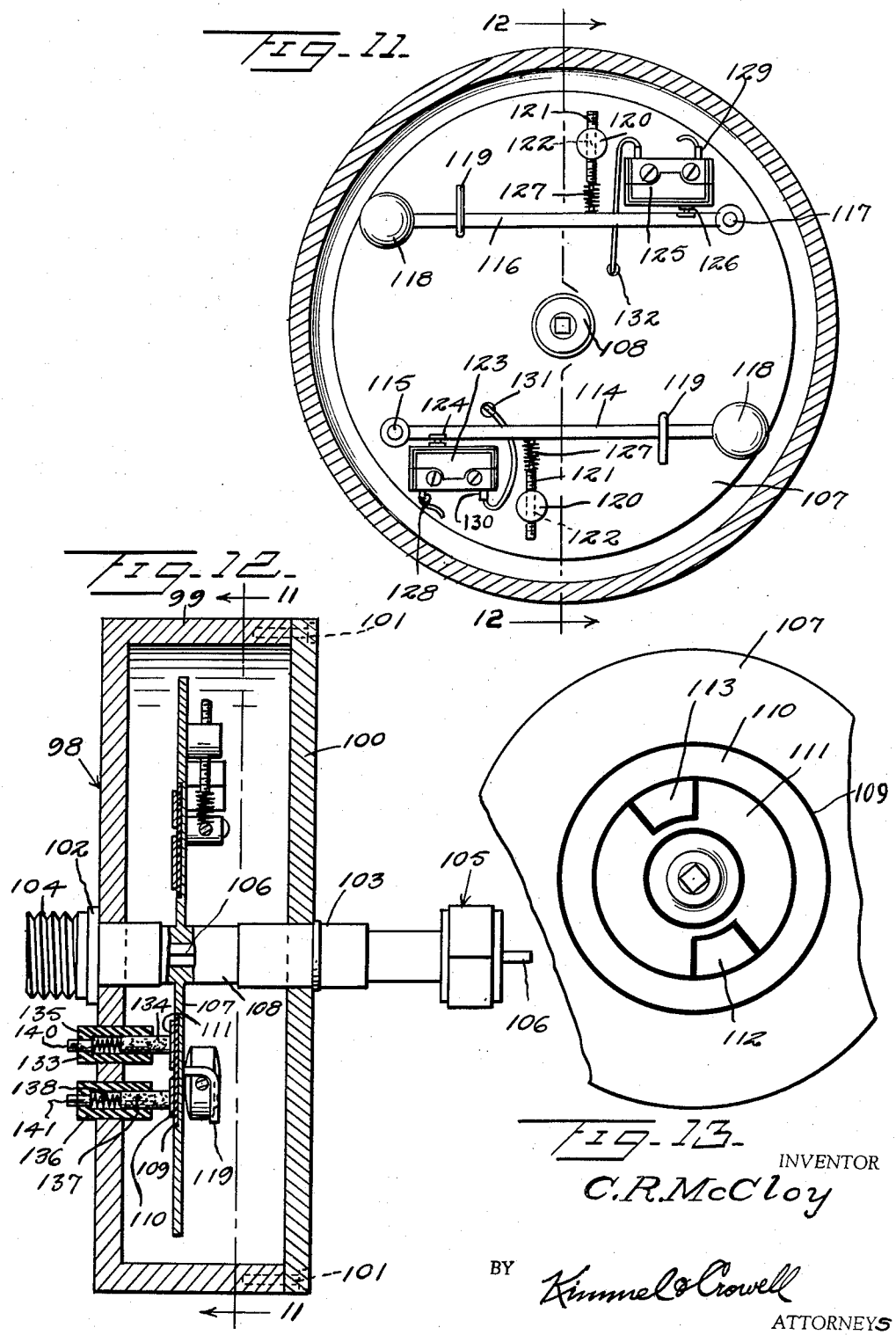
INVENTOR
C. R. McCloy
BY
Kimmel & Crowell
ATTORNEYS Patented Sept. 9, 1958

2,851,555

SPEED REGULATING MEANS FOR VEHICLES

Clark R. McCloy, Miami, Fla.

Application January 11, 1956, Serial No. 558,572

7 Claims. (Cl. 200—80)

The present invention relates to a speed regulating means for a vehicle, and more particularly to mechanisms automatically limiting the speed of any engine and controlled by either vehicle road speed or directly by the engine speed.

The primary object of this invention is to provide a speed regulating means for motor vehicles which can be readily attached to the present construction of vehicles, so as not only to regulate the speed of the vehicle, but also to permit the vehicle to retain ample power for climbing hills and pulling loads at a reasonable speed.

Another object of this invention is to provide a speed regulating means which can be made responsive to either the engine speed or the road speed.

A further object of the invention is to provide a speed regulating means which is electrically operated and positive in action, and when installed, so sealed that the driver of the vehicle cannot tamper with the regulator.

A still further object of the invention is to provide a speed regulating means which operates by reducing the number of cylinders in operation while permitting the reduced number to operate to prevent accumulation of explosive vapors in the exhaust system of the vehicle.

Other objects and advantages will become apparent in the following specification when considered in the light of the attached drawings, in which:

Figure 1 is a fragmentary side elevation of a distributor equipped with a regulating means constructed according to the invention shown connected to a valve control for the intake manifold.

Figure 2 is an exploded side elevation of a distributor showing the relationship of the speed regulator thereto, partially broken away and partially in section.

Figure 3 is a vertical cross-section taken along the line 3—3 of Figure 4, looking in the direction of the arrows.

Figure 4 is a top plan view of the speed regulator mechanism with the cover removed.

Figure 5 is a bottom plan view of the commutator.

Figure 6 is a top plan view of the regulator.

Figure 7 is an enlarged fragmentary cross-section of the regulator illustrating the fit of the cover to the base plate.

Figure 8 is a semi-diagrammatic wiring plan illustrating the relationship of the electrical circuits to the regulator.

Figure 9 is a top plan view of the butterfly valve and operator with the operator cover removed.

Figure 10 is a transverse cross-section taken along the line 10—10 of Figure 9, looking in the direction of the arrows.

Figure 11 is a transverse cross-section taken along the line 11—11 of Figure 12, looking in the direction of the arrows, of a modified form of the invention constructed for use with the speedometer cable.

Figure 12 is an enlarged vertical cross-section taken along the line 12—12 of Figure 11, looking in the direction of the arrows.

Figure 13 is a bottom plan view of the commutator disc illustrated in Figure 12, partially broken away.

Figure 14 is a side elevation, partially broken away, of a modified governor structure adapted to be attached to a speedometer drive.

Referring to the drawings, and particularly to Figures 1, 9 and 10, the numeral 20 designates generally a butterfly valve housing which is adapted to be interposed between the outlet or discharge side of a carburetor and the intake side of an intake manifold of an internal combustion engine. The housing 20 has journalled therein a shaft 21 which intersects an opening 23 extending vertically through the housing 20, and a disc-shaped butterfly valve 22 is secured by fastening means 24 to the shaft 21.

An electro-magnetic operator 25 is mounted in a housing 26, secured by fastening means 27 to one side of the housing 20, and the operator 25 is constructed in the form of a solenoid coil 28 having a core 29 slidable therein. The core 29 is movable in one direction by means of a spring 30.

The operator 25 is seated in a transverse arcuate seat 31 formed interiorly of the housing 26, and the core 29 is connected with a shaft 21 as will be hereinafter described.

A crank arm 32 is fixed to the shaft 21 within the housing 26, and a link 33 is pivotally secured at one end to the crank 32. An obtusely angled lever 34 is pivoted by a rivet 35 to a lug 36 carried by the housing 26, and one end of the lever 34 is pivotally connected to the link 33. The other end of the lever 34 is pivotally connected to a link 37 which is pivotally connected with the outer end of the solenoid core 29. The housing 26 is provided, adjacent one end thereof with a pair of terminals 38 and 39 with which the ends of the solenoid coil are connected.

In order to provide means whereby the butterfly valve member 22 may be regulated so that it will not be completely closed upon operation of the coil 28, a threaded stop member 40 is threadedly mounted in a lug 41 interiorly of the housing 26. The stop member 40 extends into the bore of the coil 28 and confronts one end of the core 29 limiting the movement of the core 29 into the coil 28. Obviously, this can be set so that the engine will receive a predetermined quantity of gasoline when the coil 28 is energized.

In Figure 2 of the drawings is illustrated a conventional distributor 42 which has a regulator, generally indicated at 43, positioned therein replacing the conventional rotor (not shown). The distributor 42 has a conventional distributor shaft 44 extending upwardly therein and is adapted to be closed by a distributor cap 45 in the usual manner. The regulator 43 comprises a socket portion 46 which is adapted to be positioned over the upper end of the distributor shaft 44 and keyed thereto by key 47 formed within the socket member 46 and extending into a groove (not shown) in the distributor shaft 44, see Figure 3.

The socket member 46 has a medial radially extending annular base plate 48 extending integrally therefrom as particularly illustrated in Figure 3. The outer edge of the base plate 48 is provided with an upstanding annular flange 49 as illustrated in Figure 7. A commutator plate 50 is secured to the lower side of the base plate 48 by any suitable means and is formed of insulating material. A commutator ring 51 is printed on or otherwise secured to the underside of the commutator plate 50, and a second commutator ring 52 is concentrically positioned on the commutator plate 50 within the commutator ring 51 and spaced therefrom for insulation purposes.

A segment 53 is formed within the commutator ring 52 and is insulated therefrom. A second segment 54 is likewise formed within the confines of the commutator ring 52 and is insulated therefrom. The segments 53 and 54 are positioned diametrically opposite to each other.

The upper end of the socket 46 is closed by a wall 55 having a bore 56 extending therethrough. A cover 57 formed of insulating material has a threaded adapter socket forming member 58 axially embedded on the underside thereof to receive a threaded bolt 59 which extends through the wall 55 to secure the cover 57 to the socket portion 46. The cover 57 is provided with a depending side wall 60 having a groove 61 formed therein to engage and overlie the flange 49. The cover 57 is provided with a radially extending groove 62 in the top face thereof. A rivet 63 is embedded within the cover 57 extending upwardly through the groove 62.

A contact spring 64 is positioned within the groove 62 over the rivet 63. The contact spring 64 has a radially inwardly and upwardly extending contact pad 65 formed at the inner end thereof to engage the coil contact 66 in the distributor cap 45. A contact arm 67 is positioned within the groove 62 overlying the contact spring 64 and likewise is positioned over the rivet 63. The rivet 63 is headed at 68 to secure the contact arm 67 and the contact spring 64 thereon and in electrical connection to each other.

The contact arm 67 extends radially outwardly from the rivet 63 and is adapted to electrically cooperate with the spark plug terminals 69 in the distributor cap 45. The contact spring 64 and the contact arm 67 replace the contact arm and spring of the normal rotor button of the conventional distributor and completes the circuit from the spark coil to the spark plugs selectively and alternately as the shaft 44 revolves during the operation of the engine.

The upper side of the base plate 48 has extending upwardly therefrom a pair of integral bosses 70. The bosses 70 are diametrically opposite to each other and symmetrically arranged on the base plate 48. Each of the bosses 70 is encircled by an upstanding shoulder 71.

A flyweight 72 is pivoted to one of the bosses 70 and is provided with a switch operating arm 73 projecting from one end thereof and a weighted body portion 74 extending oppositely from the arm 73. A flyweight 75 is pivoted to the opposite boss 70 and is likewise provided with a switch operating arm 76 and a weighted body portion 77. The flyweights 72 and 75 are supported in spaced apart relation to the base plate 48 by the shoulders 71 and by upstanding arcuate elongated aligning lugs 78 which are positioned under the body portions 74 and 77. The lugs 78 are formed integrally with the base plate 48 and extend upwardly therefrom.

A pair of spring mounting lugs 79 are positioned adjacent each of the bosses 70 in upwardly extending integral relation to the base plate 48. An adjusting screw 80 extends laterally through each of the lugs 79 in threaded engagement therewith. A locking screw 81 extends transversely to the adjusting screw 80 and is adapted to engage the side thereof to lock the adjusting screw 80 in adjusted position. The inner end of the adjusting screw 80 is provided with a spring seating boss 82.

The flyweights 72 and 75 are provided with spring receiving recesses 83 and 84, respectively. A coil spring 85 extends between each of the adjusting screws 80 and the spring recesses 83 and 84 to resiliently press the weighted body portions 74 and 77 of the flyweights 72 and 75 inwardly to switch releasing position.

A pair of micro switches 86 and 87 are secured to the upper side of the base plate 48 with the operating buttons 88 and 89, respectively, thereof presented to the switch arms 73 and 76 of the flyweights 72 and 75. The relationship of the switches 86 and 87 to the flyweights 72 and 75 is such that upon rotation of the base plate 48 the weighted bodies 74 and 77 will move outwardly under centrifugal force to operate the contact buttons 88 and 89 of the switches 86 and 87.

One side 90 of the switch 86 is electrically connected to the socket 46 as illustrated at 91 so that the side 90 of the switch 86 will be grounded through the shaft 44. One side 92 of the switch 87 is electrically connected at 93 to the socket 46 so as to ground the side 92 of the switch 87.

A second contact 94 on the switch 86 is electrically connected to the commutator ring 52, and a second contact 95 on the micro switch 87 is electrically connected to the commutator ring 51 so that upon closing of the switch 86 the commutator ring 52 will be connected to ground, and upon closing of switch 87 the commutator ring 51 will be connected to ground.

The cover 57 is provided with a key 96 in the groove 61 which is adapted to project into a gap 97 in the flange 49 so as to align the cover 57 with the base plate 48 maintaining the correct relationship between the contacts 65 and 66 with the distributor shaft 44.

In Figures 11, 12 and 13 a modified form of the invention to that disclosed in Figure 3 is set forth. The device illustrated in Figures 11 through 13 is adapted to be associated with the speedometer cable of the vehicle rather than with the distributor shaft, in order to achieve road speed governing.

A casing, generally indicated at 98, is provided with an upstanding annular side wall 99 and a cover 100 secured thereto by securing elements 101. A bushing 102 is seated axially in the base of the casing 98 and a bushing 103 in axial alignment with the bushing 102 is seated in the cover 100. The bushing 102 is provided with means 104 for securing the bushing 102 to a speedometer cable or transmission. Bushing 103 is provided with means 105 for securing the bushing 103 to a speedometer cable or speedometer. A shaft 106 extends through the casing 98, bushings 102 and 103, and projects from the means 105 to permit its connection to the corresponding portions of a speedometer drive cable or speedometer.

A rotating base plate 107 is provided with a central hub 108 in engagement with the shaft 106 and supported by the bushings 102 and 103. The base plate 107 is positioned within the casing 98 and extends radially thereof. One side of the base plate 107 is provided with an insulating ring 109 which has a commutator ring 110 printed on or otherwise secured thereto. A second commutator ring 111 is printed on or otherwise secured to the insulating ring 109 in concentric relation to the commutator ring 110.

Segments 112 and 113 here shown to be diametrically opposed to each other are formed within the confines of the commutator ring 111 as illustrated in Figure 13. The commutator rings 110 and 111 and the segments 113 are each spaced apart from each other and insulated from each other and from the base plate 107.

A flyweight 114 is pivotally secured to the base plate 107 by means of a pivot screw 115. A second flyweight 116 is pivotally secured to the base plate 107 in diametrically opposed position by means of a pivot screw 117. Weighted end portions 118 are secured to the outer ends of each of the flyweights 114 and 116.

A pair of L-shaped weight retaining brackets 119 are secured to the base plate 107 and extend upwardly therefrom engaging over the flyweights 114 and 116 as illustrated in Figures 11 and 12. A pair of diametrically opposed bosses 120 extend outwardly from the base plate 107 and carry flyweight tension adjusting screws 121 in threaded bores 122.

A micro switch 123 is positioned adjacent the flyweight 114 and has an operating button 124 which is adapted to be depressed by the flyweight 114. A micro switch 125 is mounted on the base plate 107 and has an operating button 126 which is adapted to be depressed by the flyweight 116. Coil springs 127 extend between the flyweights 114 and 116 and their respective adjusting screws 121.

One terminal 128 of the switch 123 is electrically connected to the base plate 107 which is grounded through the casing 98. One terminal 129 of the micro switch 125 is connected to the base plate 107 to ground the micro switch 125. Another terminal 130 of the micro switch 123 is electrically connected to the commutator ring 110 at 131. The second terminal of the micro switch 125 is electrically connected to the commutator ring 111 at 132.

An insulated brush holder 133 projects through the bottom wall of the casing 98 and carries a brush 134 therein. A spring 135 positioned within the brush holder 133 resiliently presses the brush 134 against the commutator ring 111. A second insulated brush holder 136 is likewise positioned within the base of the casing 98 and carries a brush 137 therein. A spring 138 resiliently presses the brush 137 against the commutator ring 110.

An armored cable 139 encloses the brush holders 135 and 136 and the electric wires 140 and 141 extending therefrom.

Referring now again to Figures 2 and 3, it should be noted that the regulator 43 is mounted on the distributor shaft 44 within a distributor 42 and that a brush holder 142 is mounted to a terminal lug 143 by means of a generally L-shaped bracket 144. The brush holder 142 has a pair of brushes 145 and 146 extending therefrom and coil springs 147 and 148 are positioned to resiliently press the brushes 145 and 146 upwardly against the commutator rings 51 and 52, respectively.

The brush 146 is electrically connected to the bracket 144 and hence to the terminal 143 which serves as a terminal for the breaker points (not shown) within the distributor 42. A wire 149 extends from the brush 145 and to a signal 150 positioned remotely from the distributor 42.

Referring now to Figure 8 it can be seen that the commutator rings 51 and 52 are electrically connected to the micro switches 86 and 87 so that when the flyweights 72 and 75 pivot to close the switches 86 and 87, circuits will be established from the commutator rings 51 and 52 to ground. The brushes 145 and 146, respectively, engage the communtator rings 51 and 52 and extend to a signal 150 in one case, and to breaker points, generally indicated at 151, in the other instance.

Obviously, when the micro switch 87 is closed, the signal 150 will be energized by current flowing therethrough from a battery 152. When the micro switch 86 is closed, the points 151 will be grounded out during a portion of the rotation of the regulator 43 while the brush 146 is in contact with the commutator ring 52, but will permit the flow of electricity to the points 151 during the period that the brush 146 is in contact with the segments 53 and 54.

The reference numeral 153 indicates generally a spark coil, and the reference numeral 154 indicates generally a condenser completing the normal electrical circuit of a motor vehicle ignition system.

Referring again to Figure 1, an armored cable 155 connects the distributor 42 with the butterfly valve 20 protecting the electrical connections therebetween rendering them tamper proof.

In the use and operation of the invention, the regulator 43 can be used in the distributor 42 to create a signal when an excess speed is about to be reached, and to short out all but two of the spark plugs when an excess speed is reached to act as a governor on the speed.

The regulator 43 can also be used as illustrated in Figures 1 and 8 to energize the coil 25 of a carburetor shut-off butterfly valve 20 to prevent an excess amount of gasoline being drawn into the engine during the period that a portion of the spark plugs are inoperative.

The modified structure illustrated in Figure 15 can be substituted for the distributor regulator 43 and is attached to the speedometer cable of the vehicle. Obviously, this unit can be used in the identical manner in the use of the distributor regulator 43 either alone or in conjunction with the gasoline shutoff valve 20. The modified structure is controlled by road speed while the preferred form is controlled by engine speed.

Having thus described the preferred embodiments of the invention, it should be understood that numerous other modifications and structural adaptations may be resorted to without departing from the scope of the appended claims.

What is claimed is:

1. A centrifugal switch for the control of the speed in an internal combustion engine including a rotatable shaft and a rotor fixed thereon, the combination of a pair of normally ungrounded commutator rings carried by said rotor in concentric relation to the axis of said shaft, a pair of normally open switch contacts each pair serving a ring with one contact thereof electrically connected to its respective ring and the opposite contact thereof connected to ground, a pair of spring retracted governor weights pivotally mounted on said rotor and each juxtaposed relative to a switch contact pair and operable under the centrifugal force developed in said rotor to close its respective contact pair whereby to ground the corresponding ring, one of said rings including insulated portions in the operative surface thereof electrically disconnected therefrom, a stationary brush for each of said rings in electrical wiping contact therewith and forming a terminal for an electrical conductor.

2. The invention as defined in claim 1, and: a housing for each of said switch contact pairs for the electrical insulation thereof from said governor weights.

3. A centrifugal switch for a speed control means in an internal combustion engine, the combination with a shaft and a rotor carried thereby for rotation therewith, a normally ungrounded circuit path carried by said rotor in concentric relation with the axis of said shaft, a pair of normally open switch contacts having one contact electrically connected to said path and the opposite contact connected to ground, centrifugally operable means mechanically associated with said switch contacts to effect the closing thereof and ground said circuit path, at least one non-conductor component in said circuit path interrupting continuous electrical conductivity therethrough, a stationary brush in electrical wiping contact with said circuit path and forming a terminal for an electrical conductor.

4. The invention as defined in claim 3, and: a housing for said switch contact pair for the electrical insulation thereof from said centrifugally operable means.

5. A centrifugal switch for controlling the speed of an internal combustion engine, comprising in combination with a rotatable shaft and a rotor fixed thereon, a normally ungrounded circular circuit path in concentric relation with the axis of said shaft, conductor means connecting said circuit path to ground, circuit making and breaking means interposed in said conductor means, centrifugally operable means mechanically associated with said circuit making and breaking means effective to close the circuit therethrough whereby to ground said circuit path, a pair of diametrically opposed non-conductor segments interposed in said circuit path and a brush in electrical wiping contact with said path and forming a terminal for an electrical conductor.

6. The invention as defined in claim 5, and: a housing for said circuit making and breaking means for the electrical insulation thereof from said centrifugally operable means.

7. In a centrifugal switch, a rotatable shaft and a rotor fixed thereon, a pair of normally ungrounded commutator rings carried by said rotor in concentric relation with the axis of said shaft, a pair of normally open switch contacts each pair serving one of said rings with one contact thereof electrically connected to its respective ring and the opposite contact thereof connected to ground, a pair of spring retracted governor weights pivoted on said rotor each juxtaposed relative to a switch contact pair and operable under centrifugal force to close its respective contact pair whereby to ground said rings, one of said rings including a diametrically opposed pair of non-conductor segments, a stationary brush for each of said rings in electrical wiping contact therewith and forming a terminal for an electrical conductor.

(References on following page)

References Cited in the file of this patent

UNITED STATES PATENTS

| | | |
|---|---|---|
| 1,485,197 | O'Keefe | Feb. 26, 1924 |
| 1,516,615 | Meile | Nov. 25, 1924 |
| 1,936,993 | Reed | Nov. 28, 1933 |
| 1,961,062 | Mallory | May 29, 1934 |
| 2,079,539 | White et al. | May 4, 1937 |
| 2,174,062 | Raesler | Sept. 26, 1939 |
| 2,181,429 | Hansen | Nov. 28, 1939 |
| 2,201,629 | McCullough | May 21, 1940 |
| 2,225,206 | Cassels | Dec. 17, 1940 |
| 2,291,165 | Lyons | July 28, 1942 |
| 2,324,169 | Moran | July 13, 1943 |
| 2,605,368 | Scott | July 29, 1952 |
| 2,649,513 | Luhn | Aug. 18, 1953 |
| 2,740,006 | Drugan | Mar. 27, 1956 |